J. RAPER.
SHOCK ABSORBER.
APPLICATION FILED FEB. 7, 1916.

1,187,175.

Patented June 13, 1916.

Witnesses
Fredrick W. Ely
P. M. Smith

Inventor
John Raper.
By Victor J. Evans
Attorney

UNITED STATES PATENT OFFICE.

JOHN RAPER, OF LUCAMA, NORTH CAROLINA.

SHOCK-ABSORBER.

1,187,175.  Specification of Letters Patent.  Patented June 13, 1916.

Application filed February 7, 1916. Serial No. 76,782.

*To all whom it may concern:*

Be it known that I, JOHN RAPER, a citizen of the United States, residing at Lucama, in the county of Wilson and State of North Carolina, have invented new and useful Improvements in Shock-Absorbers, of which the following is a specification.

This invention relates to shock absorbers, being especially designed for use upon motor vehicles such as automobiles, motor trucks and the like The object of the invention is to provide an extremely simple, practical, economical and reliable device which may be easily applied to any machine of the class referred to and which will operate to relieve the vehicle springs proper by cushioning the upward and downward movement of the springs, the shock absorber of this invention also acting as a check to the rebound action of the vehicle springs and thereby relieving to a great extent the upward thrust usually imparted to the body of the vehicle by means of the vehicle springs. This gives additional comfort to the passengers riding in the vehicle and also saves the machine from being seriously racked and injured, also adding to the life and durability of the tires.

With the above and other objects in view, the invention consists in the novel construction, combination and arrangement of parts, as herein described, illustrated and claimed.

Figure 1:
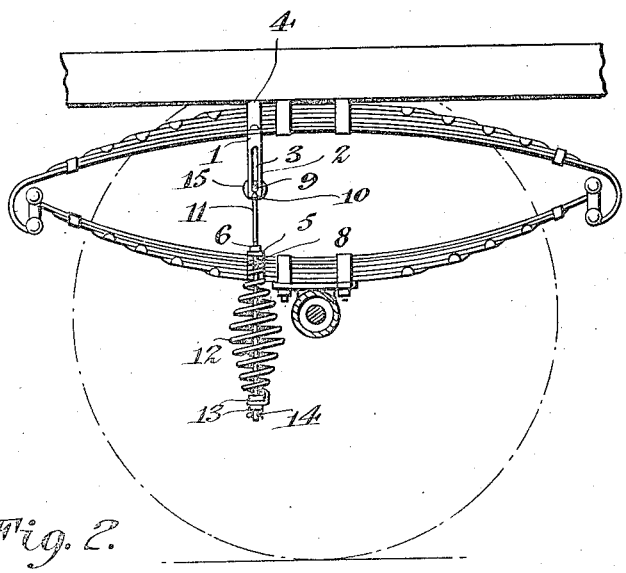
Figure 2:
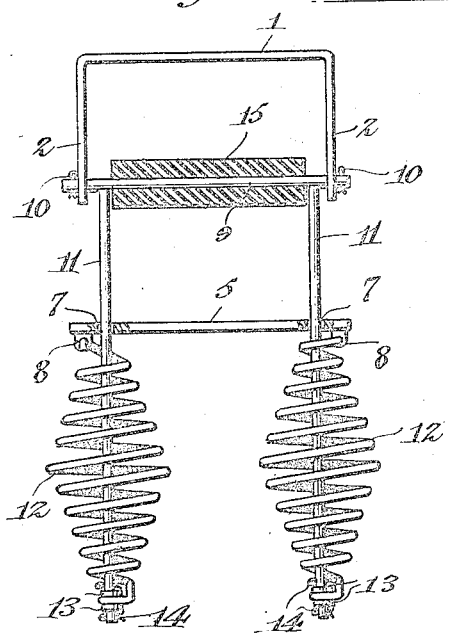
Figure 3:
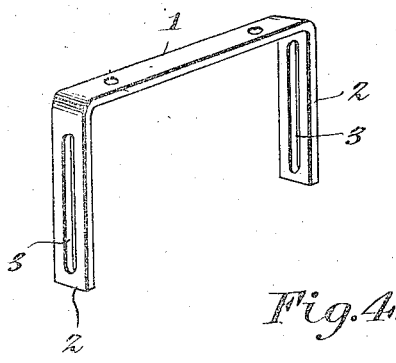
Figure 4:

In the accompanying drawings:—Figure 1 is a side elevation of a sufficient portion of a vehicle to illustrate the application of one of the shock absorbers of this invention thereto. Fig. 2 is an enlarged elevation of one of the shock absorbers partly broken away. Fig. 3 is a fragmentary perspective view of the upper attaching bar and one of its slotted arms. Fig. 4 is a plan view of the second attaching arm.

Referring to the drawings 1 designates one of the attaching bars of the shock absorber, the same having at the opposite extremities thereof parallel arms 2 which are at right angle to the bar 1, each of the arms 2 being formed with a longitudinal slot 3 the purpose of which will appear.

The bar 1 is adapted to be secured to the under side of the top section of a vehicle spring by means of bolts or clips indicated at 4, the bar 1 bearing a fixed relation to said upper portion of the spring. A second attaching bar 5 is secured to the lower portion of the vehicle spring by means of bolts or clips 6, whereby the bar 5 bears a fixed relation to said lower portion of the vehicle spring. The bar 5 is formed with guide openings 7 extending therethrough, the purpose of which will presently appear, and is further provided with lugs 8 to which the upper extremities of the springs hereinafter described are attached. A shaft 9 has its ends slidingly mounted in the slots 3 of the arms 2 of the attaching bar 1 and is normally parallel to both of the attaching bars 1 and 5. The shaft 9 is held in place by means of cotter pins or keys 10 inserted through holes near the extremities of said shaft. Between its ends, guide rods 11 extend from the shaft 9 in parallel relation to each other and perpendicularly to said shaft. The rods 11 are inserted through and slidable in the openings 7 in the second attaching bar 5. Stout coiled springs 12 are placed around the free ends of the rods 11 below the second attaching bar 5. Each of said springs 12 is secured at one extremity to the bar 5 by inserting the upper extremity of the spring through one of the lugs 8 hereinabove referred to although other means may be employed for fastening the springs to the bar 5. Each of the springs 12 is fastened at its other or lower extremity to the corresponding extremity of one of the rods 11, being shown as having its terminal convolution threaded over the rod 11 between washers 13 which are held in place by cotter pins 14 or the equivalent thereof. A bumper 15 in the form of a sleeve of resilient material such as rubber surrounds the shaft 9 and is interposed between the rods 11 which thereby act to hold said bumper in its proper position. The bumper 15 is adapted to strike against the upper and lower portions of the vehicle spring so as to prevent any rattling of the parts and any injury to the parts of the shock absorber.

From the foregoing description, taken in connection with the accompanying drawings, it will now be understood that the shock absorber embodies a construction which is simple, economical to manufacture and maintain and accessible as to all the parts thereof so that the device may be readily repaired when necessary. The strength of the springs 12 will, of course, be governed by the load to be imposed on the springs of the vehicle and the springs 12 are preferably made tapering toward each extremity thereof so that there will be no conflict between the convolutions, thereby permitting a free and smooth action of the springs which supplement the usual vehicle springs and also serve to check the rebound or upward movement of the vehicle body.

Having thus described my invention, I claim:—

A shock absorber embodying, in combination, an attaching bar having arms at right angles to the extremities of said bar parallel to each other and formed with longitudinal slots, a second attaching bar normally parallel to the first attaching bar formed with guide openings, a shaft located between said attaching bars normally parallel thereto and having its ends arranged to slide in said slots, parallel rods perpendicular to said shaft connected thereto and slidable through said guide openings, coiled springs surrounding said rods and terminally secured to the second attaching bar and the extremities of said rods, and resilient cylindrical bumper surrounding said shaft and interposed between said rods.

In testimony whereof I affix my signature in presence of two witnesses.

JOHN RAPER.

Witnesses:
 E. J. BARNES,
 GLAUCUS HUINANT.